United States Patent

Hsieh

Patent Number: 5,368,071
Date of Patent: Nov. 29, 1994

[54] WASH-BASIN FAUCET

[76] Inventor: Yung-Li Hsieh, No. 29 Pyi-Tou Lane, Treet Ding-Fan, Li.Lu Kang Cheng, Chang Hwa Hsien,

[21] Appl. No.: 185,007

[22] Filed: Jan. 24, 1994

[51] Int. Cl.[5] ............................................. F16K 11/06
[52] U.S. Cl. ........................... 137/625.41; 137/625.4; 137/625.17; 137/801
[58] Field of Search .......... 137/625.41, 625.4, 625.17, 137/801

[56] References Cited

U.S. PATENT DOCUMENTS

| | | | |
|---|---|---|---|
| 4,708,172 | 11/1987 | Riis | 137/625.4 X |
| 4,796,666 | 1/1989 | Bergmann | 137/625.41 X |

*Primary Examiner*—Arnold Rosenthal
*Attorney, Agent, or Firm*—Bacon & Thomas

[57] ABSTRACT

A wash-basin faucet includes a valve housing enclosed within a casing, a ceramic valve received in a cylindrical chamber of the valve housing, and an operating handle operated to control the ceramic valve in regulating hot/cold water flow rate, wherein the valve has an inside annular flange, a water outlet for guiding water out of the cylindrical chamber, two water inlets for guiding hot/cold water into the cylindrical chamber, and locating recesses; the ceramic valve has a water seal ring mounted around a vertical peripheral wall thereof and stopped at the inside annular flange of the valve seal, two water intake tubes at the bottom respectively connected to either water inlet and sealed with a respective water seal ring, a plurality of bottom blocks spaced at the bottom and having a respective downward locating rod engaged into either locating recess on the bottom wall of the valve housing, a water output port disposed at the bottom between in the middle for guiding water from the water intake tubes out of the ceramic valve, and a water passage way defined at the bottom between the bottom blocks and aligned with the water outlet for guiding water from the water output port to the water outlet and the water outlet pipe.

1 Claim, 4 Drawing Sheets

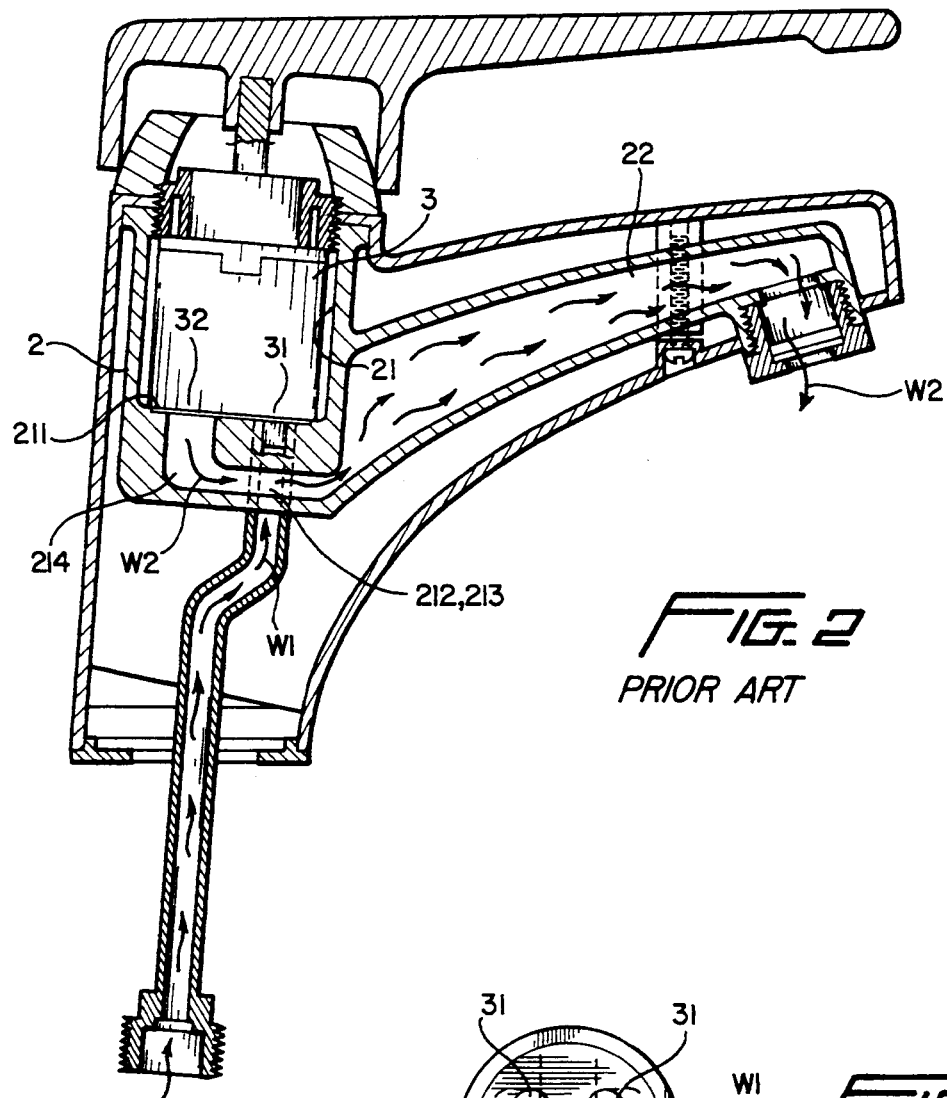
FIG. 2
PRIOR ART
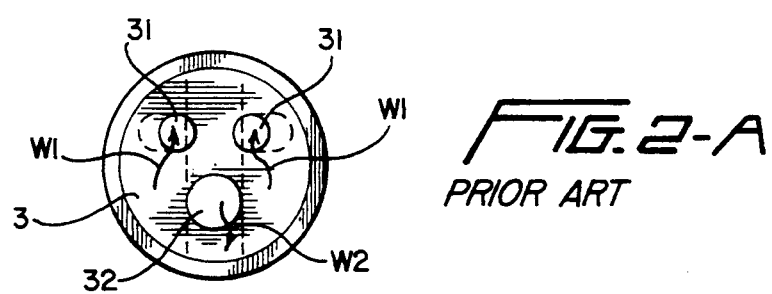
FIG. 2-A
PRIOR ART
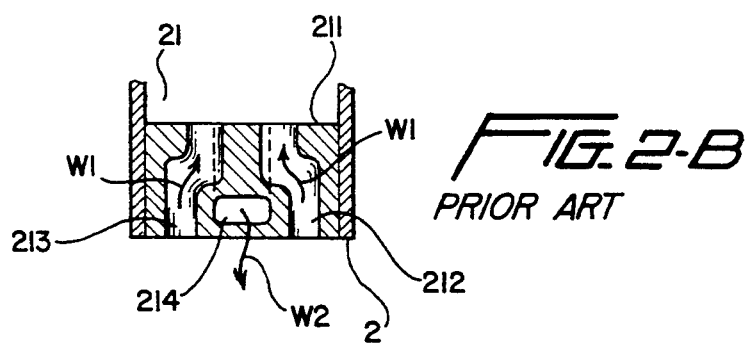
FIG. 2-B
PRIOR ART

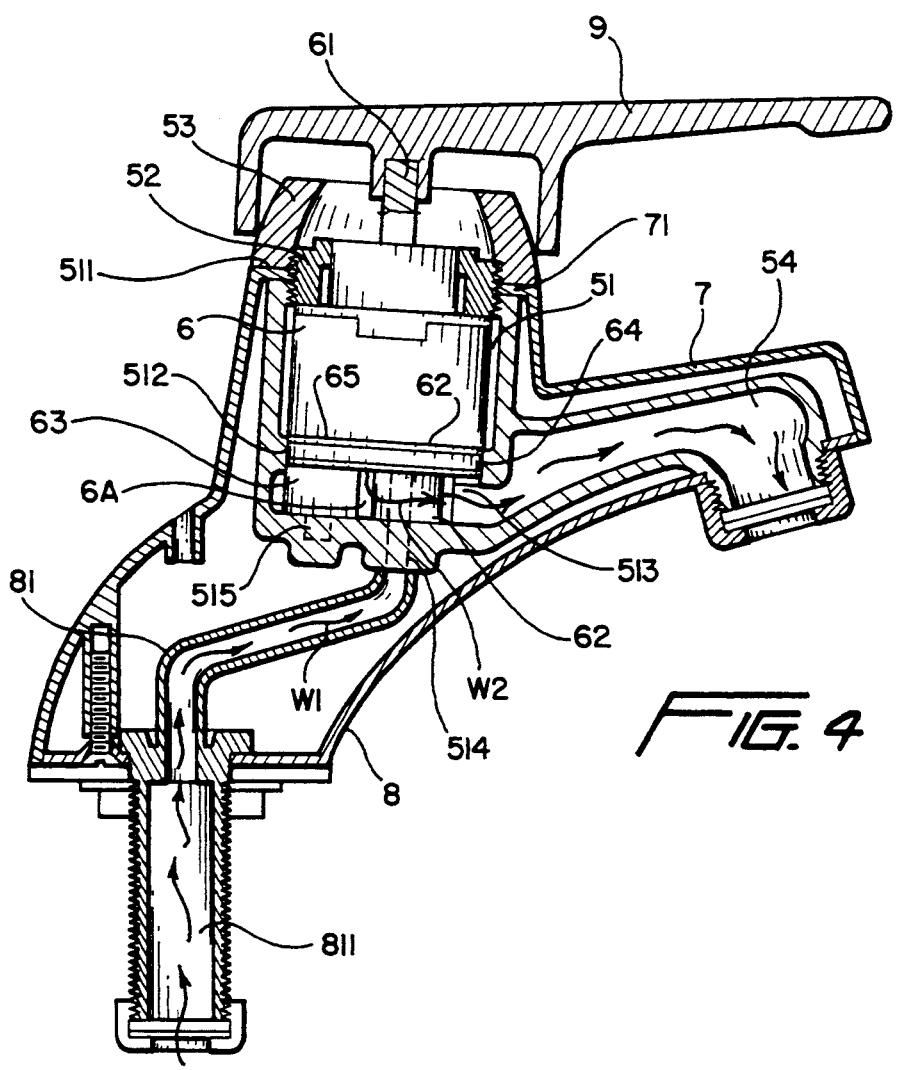
FIG. 4
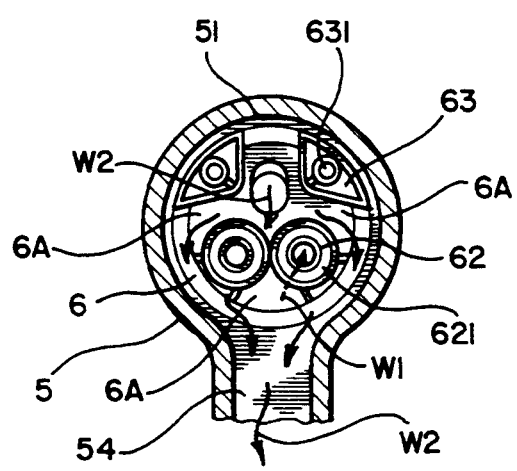
FIG. 4-B
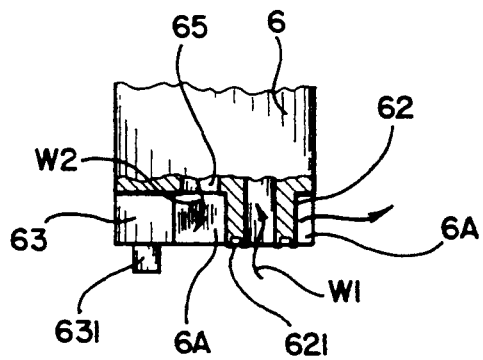
FIG. 4-A

WASH-BASIN FAUCET

BACKGROUND OF THE INVENTION

The present invention relates to faucets, and relates more particularly to a wash-basin faucet which defines a water passage at the bottom of a ceramic valve thereof above the bottom wall of a valve housing thereof for guiding hot/cold water out of the valve housing to the water outlet pipe smoothly and quickly.

A variety of faucets have been disclosed, and have appeared on the market. Conventionally, a hot/cold water faucet comprises a hot water control valve and a cold water control valve respectively controlled to regulate the flow rate of hot and cold water. Nowadays, single control valve type hot/cold water faucets have been very popular for the advantage of high convenience in hot/cold water flow rate regulation.

FIGS. 1, 2, 2-A, and 2-B show a known structure of wash-basin faucet to which the present invention pertains. The wash-basin faucet comprises a ceramic valve 3 received in a hollow valve seat 2 and covered inside a casing and controlled by an operating handle to regulate hot/cold water flow rate. The valve seat 2 comprises a chamber 21, which receives the ceramic valve 3, a horizontal blocking wall 211 on the inside at the bottom of the chamber 21, a tortuous hot water intake hole 212 and a tortuous cold water intake hole 213 vertically disposed through the blocking wall 211 and respectively connected to the hot and cold water supply pipes for guiding hot/cold water W1 into the ceramic valve 3, and a tortuous water outlet hole 214 for guiding regulated water W2 out of the ceramic valve 3 and the valve seat 2. The ceramic valve 3 comprises a two water inlet holes 31 and a water outlet hole 32 respectively connected to the hot and cold water intake holes 212;213 and water outlet hole 214 of the valve seat 2 through end match. Because the water inlet holes 31 and water outlet hole 32 of the ceramic valve 3 are respectively connected to the hot and cold water intake holes 212;213 and water outlet hole 214 of the valve seat 2 through end match, the hot and cold water intake holes 212;213 and water outlet hole 214 of the valve seat 2 must be made tortuous to ensure the isolation of the water passage ways from one another. In order to make the water intake holes 212;213 and water outlet hole 214 tortuous, the sand molding of the valve seat 2 is complicated, causing a high defective rate. Therefore, this structure of wash-basin faucet is expensive to manufacture. Further, because regulated water W2 is guided out of the valve seat 2 to the water outlet pipe through the tortuous water outlet hole 214, water pressure will be relatively reduced when passing through the tortuous water outlet hole 214, and therefore the output flow of water from the water outlet pipe of the faucet will become unstable. If the output flow of water of the faucet is unstable, the ignition operation of the water-ignition type gas-burning water heater becomes unstable, and a leakage of fuel gas may happen.

SUMMARY OF THE INVENTION

The present invention has been accomplished under the aforesaid circumstances. It is therefore one object of the present invention to provide a wash-basin faucet which is simple in structure and inexpensive to manufacture. It is another object of the present invention to provide a wash-basin faucet which improves the ignition efficiency of the water ignition type gas-burning water heater.

According to the preferred embodiment of the present invention, the wash-basin faucet comprises a valve housing enclosed within a casing, a ceramic valve received in the cylindrical chamber of a valve housing, and an operating handle operated to control the ceramic valve in regulating hot/cold water flow rate, wherein the valve housing has an inside annular flange, a water outlet for guiding water out of the cylindrical chamber, two water inlets for guiding hot/cold water into the cylindrical chamber, and locating recesses; the ceramic valve have a water seal ring mounted around a vertical peripheral wall thereof and stopped at the inside annular flange of the valve housing, two water intake tubes at the bottom respectively connected to either water inlet and sealed with a respective water seal ring, a plurality of bottom blocks spaced at the bottom and having a respective downward locating rod engaged into either locating recess on the bottom wall of the valve housing, a water output port disposed at the bottom between in the middle for guiding water from the water intake tubes out of the ceramic valve, and a water passage way defined at the bottom between the bottom blocks and aligned with the water outlet for guiding water from the water output port to the water outlet and the water outlet pipe. Because regulated water is directly guided out of the ceramic valve to the water outlet on the valve housing through the water passage way, no additional water output port is needed to be made through the bottom of the valve hosing. Because tortuous water intake holes are eliminated, the structure of the valve housing is simplified, and the production of the valve housing is easy. Furthermore, because the water passage way at the bottom of the ceramic valve is disposed in line with the water outlet, regulated water is smoothly guided by the water passage way from the output port of the ceramic valve to the water outlet and the water outlet pipe, and the ignition operation of the water ignition type gas-burning water heater is smoothened.

BRIEF DESCRIPTION OF THE DRAWINGS

FIG. 2 is an assembly view in section of the wash-basin faucet shown in FIG. 1;

FIG. 2-A is a bottom view of the ceramic valve of the wash-basin faucet shown in FIG. 1;

FIG. 2-B is a sectional view of the lower part of the valve housing of the wash-basin faucet shown in FIG. 1;

FIG. 4 is an assembly view in section of the wash-basin faucet shown in FIG. 3;

FIG. 4-A is a sectional view of the lower part of the ceramic valve of the wash-basin faucet shown in FIG. 3; and FIG. 4-B is a bottom view of the valve housing and ceramic valve of the wash-basin faucet shown in FIG. 3.

DETAILED DESCRIPTION OF THE PREFERRED EMBODIMENT

Figure 1:
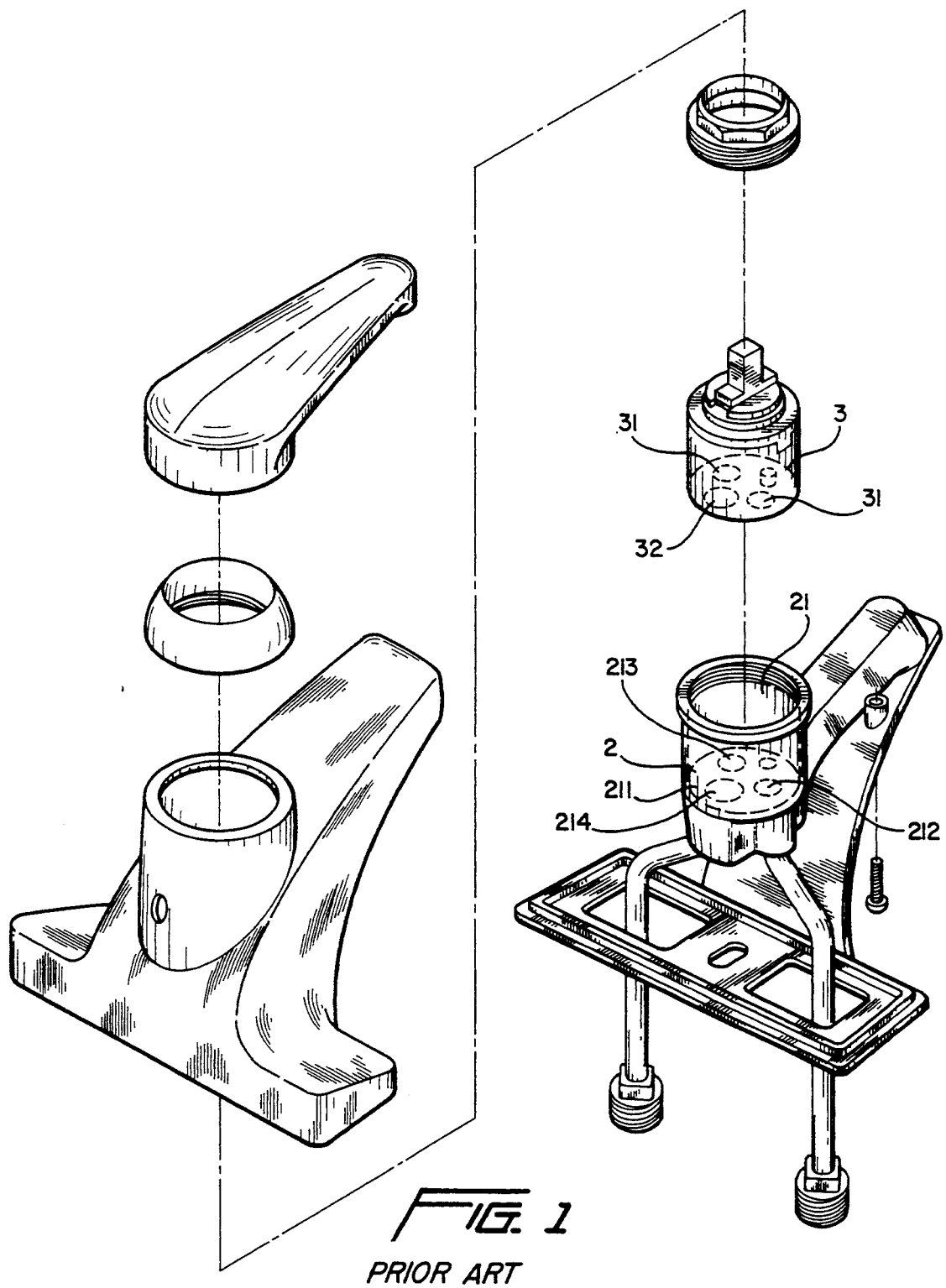
FIG. 1 is an exploded view of a wash-basin faucet according to the prior art.
Figure 3:
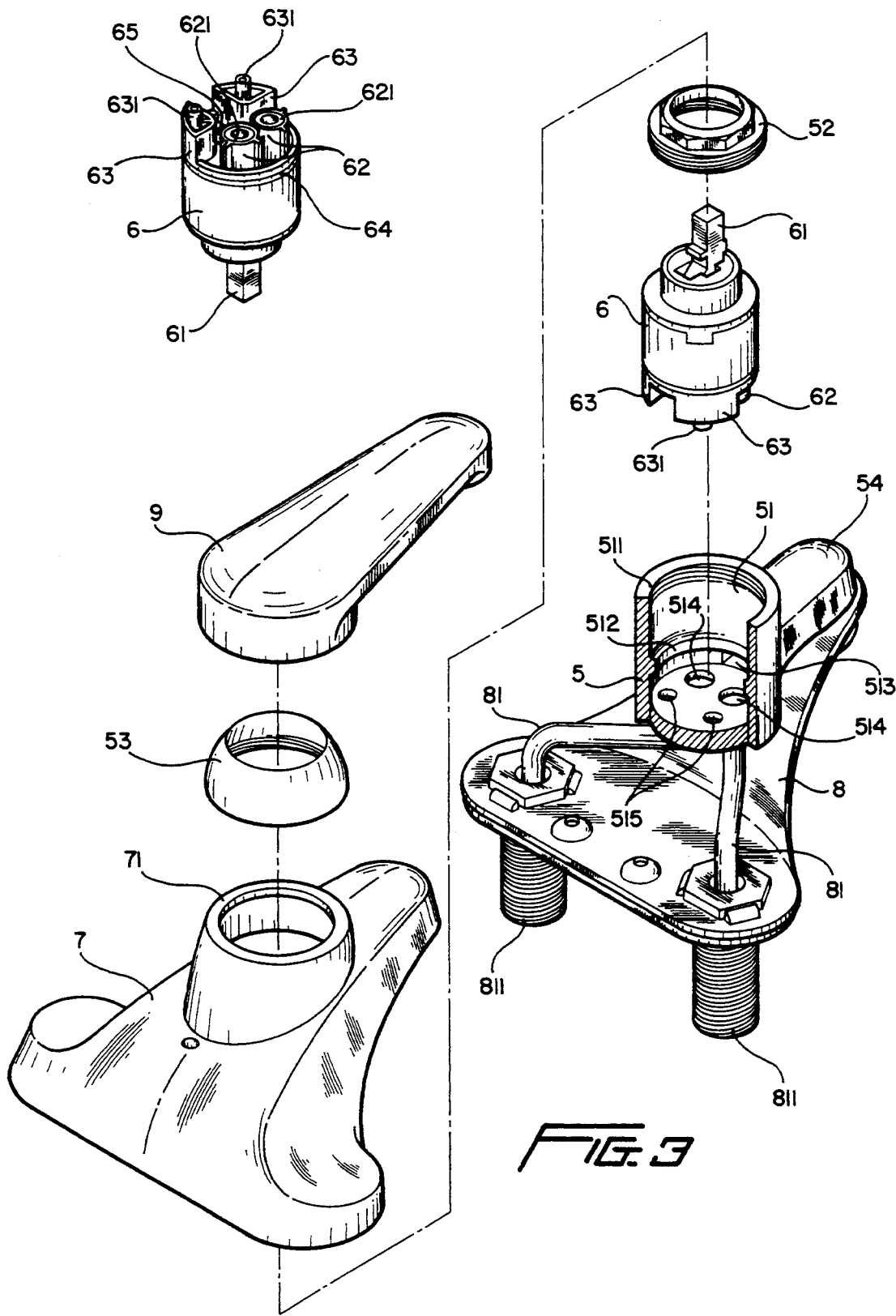
FIG. 3 is an exploded view of a wash-basin faucet according to the preferred embodiment of the present invention.

Referring to FIGS. 3, 4, 4-A, and 4-B, a wash-basin faucet in accordance with the present invention is generally comprised of a valve housing 5, a ceramic valve 6, a casing 7, a base frame 8, and an operating handle 9. The valve housing 5 comprises a cylindrical chamber 51, which receives the ceramic valve 6. The cylindrical chamber 51 has an inner thread 511 around the inside wall thereof at the top. An externally threaded locating ring 52 is fastened to the inner thread 511 to hold down the ceramic valve 6 inside the cylindrical chamber 51. The casing 7 is covered over the valve housing 5, having an open neck 71 mounted around the locating ring 52 and fixed by a cap nut 53. The ceramic valve 6 has a switch lever 61 at the top extended out of the open neck 71 and the cap nut 53 and connected to one end of the operating handle 9. The base frame 8 is disposed beneath the valve housing 5 and covered on the casing 7 at the bottom. When mounted, the connecting area between the base frame 8 and the casing 7 is sealed. There are two connecting pipes 811 spaced at the bottom of the base frame 8 for connecting to the hot and cold water supply pipes (not shown) respectively, and two water intake pipes 81 spaced at the top of the base frame 8 and connected between the connecting pipes 811 and the valve housing 5.

Referring to the annexed drawings again, the valve housing 5 comprises an inside annular flange 512 projecting into the cylindrical chamber 51 near the bottom, a water outlet 513 at the bottom of the cylindrical chamber 51, and connected to a water outlet pipe 54, two water inlets 514 on the bottom of the cylindrical chamber 51 respectively connected to the water intake pipes 81, and a plurality of locating recesses 515 on the bottom of the cylindrical chamber 51 near the water inlets 514. The ceramic valve 6 comprises two water intake tubes 62 vertically disposed at the bottom and respectively fastened with a respective water seal ring 621 at the bottom, a plurality of bottom blocks 63 spaced at the bottom and having a respective downward locating rod 631, a water seal ring 64 mounted on an outside annular groove (not shown) around the periphery thereof in the middle, and a water output port 65 at the bottom between the water intake tubes 62 and the bottom blocks 63. The ceramic valve 6 further comprises a water chamber (not shown) on the inside which communicates between the water output port 65 and the water intake tubes 62. When the ceramic valve 6 is inserted into the cylindrical chamber 51 of the valve housing 5, the water seal ring 64 on the periphery of the ceramic valve 6 is stopped at the inside annular flange 512 to seal water from flowing upwards through the gap between the ceramic valve 6 and the valve housing 5, the water seal ring 621 on either water intake tube 62 is respectively mounted on either water inlet 513 permitting hot/cold water W1 to flow into the ceramic valve 6, the locating rod 631 of either bottom block 631 is respectively engaged into either locating recess 515. Because the ceramic valve 6 is supported on the bottom of the cylindrical chamber 51 of the valve housing 5 by the water intake tubes 62 and bottom blocks 63 thereof, a water passage way 6A is defined beneath the ceramic valve 6 and communicated with the water outlet 513. When water W1 enters the water intake tubes 62, the switch lever 61 of the ceramic valve 6 is operated by the operating handle 9 to regulate hot/cold water flow rate as desired. The regulated flow of water W2 is then flowing out of the ceramic valve 6 through the water output port 65 and then flowing through the water passage way 6A to the water outlet pipe 54 via the water outlet 513. Because water directly flows through the water passage way 6A to the water outlet 513 and the water outlet pipe 54 without passing through any meanders, hot water can be smoothly guided out of the faucet, and therefore the safety of the gas-burning water heater is ensured. This water passage way 6A eliminates the arrangement of a complicated water passage way structure.

While only one embodiment of the present invention has been shown and described, it will be understood that various modifications and changes could be made without departing from the spirit and scope of the invention.

What is claimed is:

1. A wash-basin faucet comprising a base frame mounted on a wash-basin, two water intake pipes mounted on said base frame, a valve housing defining a cylindrical chamber, a ceramic valve received inside said cylindrical chamber of said valve housing, a locating ring mounted on said valve housing to hold said ceramic valve in said cylindrical chamber, a casing mounted on said base frame and covered over said valve housing, a water outlet pipe extended from said valve housing out of said casing, an operating handle fastened to said casing and said locating ring by a cap nut and operated to control said ceramic valve in regulating the hot/cold water flow rate passing from said water intake pipes to said water outlet pipe; wherein:

said valve housing comprises an inside annular flange projecting into said cylindrical chamber and spaced above a bottom wall thereof, a water outlet communicated between said cylindrical chamber and said water outlet pipe, two water inlets on the bottom wall, to which said water intake pipes are respectively connected, and a plurality of locating recesses on the bottom wall near said water inlets;

said ceramic valve comprises a first water seal ring mounted around a vertical peripheral wall thereof and stopped at the inside annular flange of said valve housing, two water intake tubes vertically disposed at the bottom, each water intake tube of said ceramic valve having a bottom end fastened with a respective second water seal ring and connected to either water inlet on the bottom wall of said valve housing for guiding water from said water intake pipes into said ceramic valve, a plurality of bottom blocks spaced at the bottom and having a respective downward locating rod engaged into either locating recess on the bottom wall of said valve housing, a water output port disposed at the bottom in the middle between said water intake tubes and said bottom blocks, and a water passage way defined at the bottom between said bottom blocks and aligned with said water outlet for guiding water from said water output port to said water outlet and said water outlet pipe.

* * * * *